(12) United States Patent
Mishima et al.

(10) Patent No.: US 8,726,162 B2
(45) Date of Patent: May 13, 2014

(54) AUDIO APPARATUS MEDIA FOLDERS AND FILES ORGANIZATION

(75) Inventors: Takeru Mishima, Iwaki (JP); Noboru Yamazaki, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 266 days.

(21) Appl. No.: 12/837,812

(22) Filed: Jul. 16, 2010

(65) Prior Publication Data

US 2011/0119633 A1    May 19, 2011

(30) Foreign Application Priority Data

Nov. 14, 2009   (JP) ................................ 2009-260541

(51) Int. Cl.
*G06F 13/00*    (2006.01)

(52) U.S. Cl.
USPC ............................ 715/727; 715/841; 715/853

(58) Field of Classification Search
None
See application file for complete search history.

(56) References Cited

U.S. PATENT DOCUMENTS

| | | | |
|---|---|---|---|
| 6,745,199 B2 | 6/2004 | Morita et al. | |
| 6,789,095 B2 | 9/2004 | Okuno et al. | |
| 7,113,454 B2 | 9/2006 | Matsuoka | |
| 2002/0078819 A1* | 6/2002 | Kim ................................ | 84/609 |
| 2004/0215643 A1* | 10/2004 | Brechner et al. .............. | 707/100 |
| 2008/0162669 A1 | 7/2008 | Tonoike et al. | |
| 2009/0172598 A1* | 7/2009 | Yamanaka et al. ............ | 715/841 |

FOREIGN PATENT DOCUMENTS

| | | |
|---|---|---|
| JP | 2002-041096 | 2/2002 |
| JP | 2002-236498 | 8/2002 |
| JP | 2002-288017 | 10/2002 |
| JP | 2003-030019 | 1/2003 |
| JP | 2004-030116 | 1/2004 |
| JP | 2004-318752 | 11/2004 |
| JP | 2006-031265 | 2/2006 |
| JP | 2007-250036 | 9/2007 |
| JP | 2008-165646 | 7/2008 |

OTHER PUBLICATIONS

Office Action for Japanese counterpart application Publication No. 2009260541 dated Nov. 21, 2013.

* cited by examiner

*Primary Examiner* — Stephen Hong
*Assistant Examiner* — Asher Kells
(74) *Attorney, Agent, or Firm* — Brinks Gilson & Lione

(57) ABSTRACT

An audio apparatus contains a plurality of playable files stored in a database and organized in folders. The folders can be listed in a manner understandable at a glance even when viewed on a small display area and when the hierarchical structure shows a minimum level of detail. A folder selection section selects a folder from a database, and a directly-under-folder detection section detects if a playable file exists directly under a folder selected. A folder-under-folder detection section detects if a playable file exists directly under any folder located under the selected folder assuming no playable file exists directly under the selected folder.

6 Claims, 6 Drawing Sheets

F I G. 2

FIG.3(a) CONVENTIONAL LISTING MANNER

FIG.3(b) LISTING DEPENDING ON PRESENCE OF PLAYABLE FILE DIRECTLY UNDER FOLDER AND FOLDER UNDER FOLDER AND CLOSING UP SPACE FOR FOLDER-TO-BE-HIDDEN

FIG.3(c) LISTING ACCORDING TO HIERARCHICAL ORDER

FIG.3(d) FINAL LISTING

FIG. 4

| Folder List | | NUMBER OF TUNES |
|---|---|---|
| 1  [1] ROOT | | 2 |
| 2  [ ] Folder B | | 0 |
| 3  [ ] Folder C | | 0 |
| 4  [2] Folder D | | 3 |
| 5  [3] Folder E | | 2 |
| 6  [4] Folder G | | 2 |

FIG.5

EXAMPLE OF FOLDER STRUCTURE

AUDIO APPARATUS MEDIA FOLDERS AND FILES ORGANIZATION

PRIORITY CLAIM

This application claims the benefit of Japanese Patent Application No. 2009-260541, filed on Nov. 14, 2009, and which is incorporated by reference herein in its entirety.

BACKGROUND

1. Field of the Invention

The present invention according to one embodiment relates to an audio apparatus in which audio data stored in various databases are listed on a folder-to-folder basis, clearly based on the presence of a file in each folder.

2. Description of the Related Art

One widely-used method for clearly listing many files stored in a database is to include the same type of files in a folder and include the same type of folders in an upper-level folder. In this method, a file stored in the database can be used by selecting a folder sequentially from the top-level to lower levels and finally finding a desired file. The folder structure of such a database organizes files currently stored in the database, and can additionally create a folder in advance for a new category expected to be stored in the database so that, when data in the new category is input, the data can be quickly included in that folder that can be quickly available.

Figure 5:
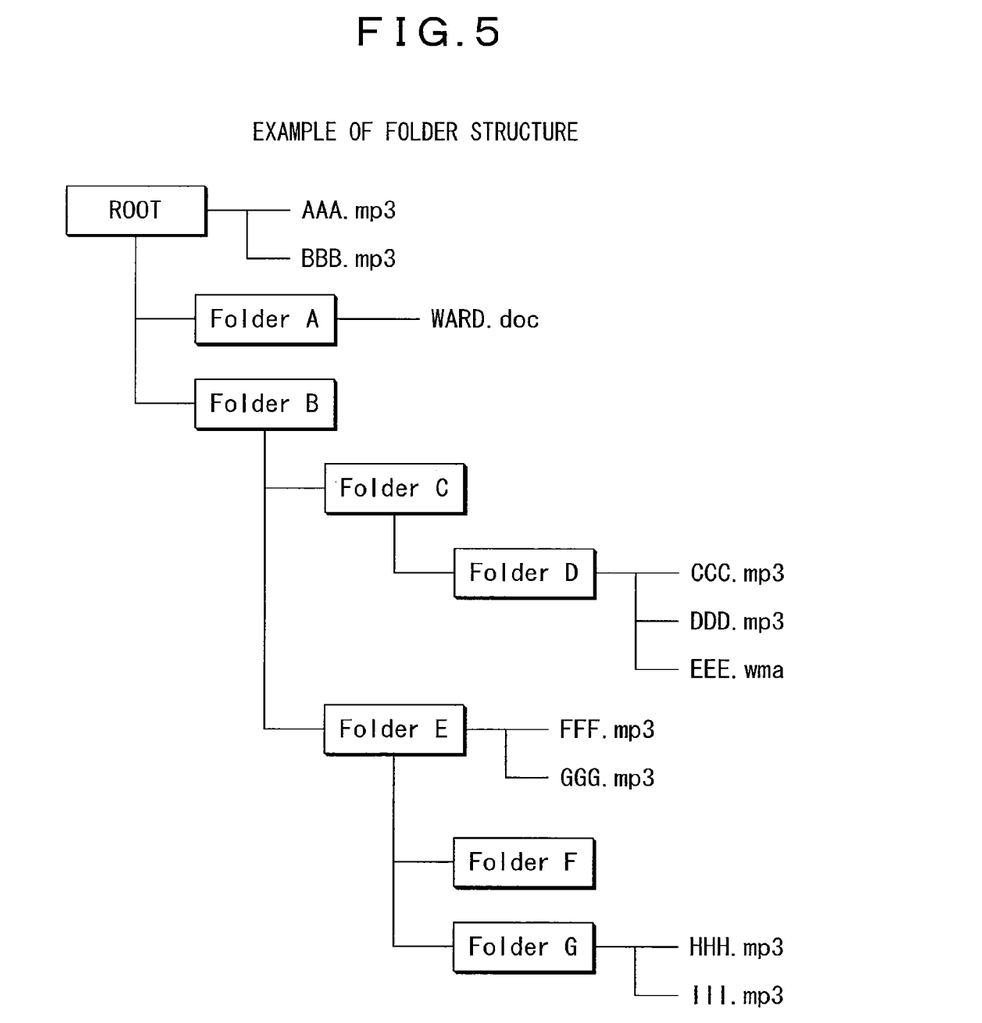
FIG. 5 shows an example of folder structure.

FIG. 5 shows an example of the above-described folder structure. FIG. 5 illustrates a hierarchical structure of folders in which files of various tunes are stored in mp3 or wma format in a database in a memory, hard-disk or the like in an audio apparatus. In FIG. 5, a "ROOT" exists as the top-level folder, and "AAA.mp3" and "BBB.mp3" files exist in the "ROOT" itself, or directly under the "ROOT."

A "Folder A" and a "Folder B" exist as lower folders belonging to the "ROOT," or as folders under the "ROOT." Directly under the "Folder A," a document file "WARD.doc" exists, and no tune file that can be played by the audio apparatus (referred to as playable file) exists. On the other hand, a "Folder C" and a "Folder E" exist under the "Folder B." No tune exists directly under the "Folder C." "FFF.mp3" and "GGG.mp3" tunes exist directly under the "Folder E."

Although no tune exists directly under the "Folder C", a "Folder D" exists under the "Folder C," and three tunes exist directly under the "Folder D," which include "CCC.mp3" and "DDD.mp3" tunes (audio files in mp3 format) and an "EEE.wma" tune (audio file in wma format). Further, the two tunes exist directly under the "Folder E" as described above. A "Folder F" and a "Folder G" exist under the "Folder E." No tune exists directly under the "Folder F", but "HHH.mp3" and "III.mp3" tunes exist directly under the "Folder G."

Figure 6A:
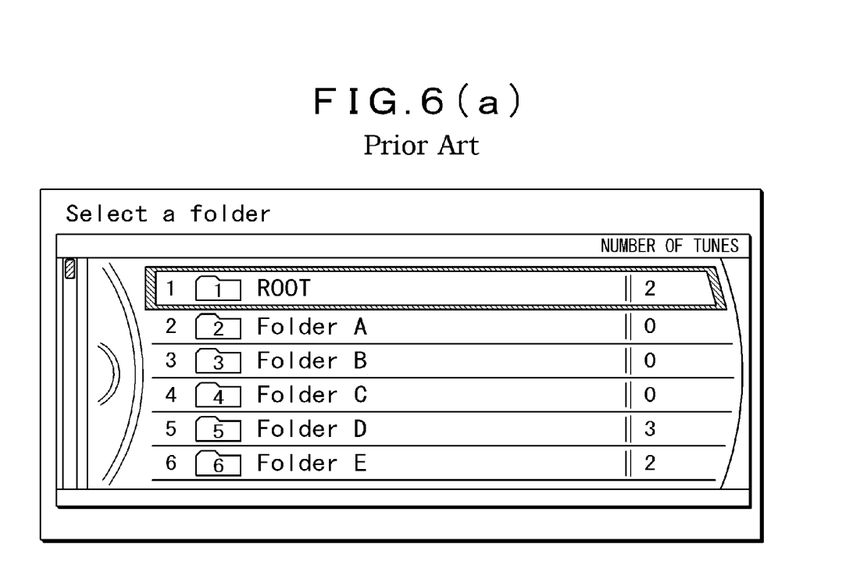
FIGS. 6(a) and 6(b) show examples of listing folders using a conventional method.

When the database in which these tune data are stored with the folder structure shown in FIG. 5 resides in a car audio apparatus, the display area is too limited to list the folder structure in detail. For example, in reality, the folders would be listed entirely in parallel without any hierarchical structure, as shown in FIG. 6(a). In the example shown in FIG. 6(a), the display of a car audio apparatus capable of listing six folders lists all folders, such as "ROOT," "Folder A," ... "Folder E," without any hierarchical structure. In this example, the numbers of tunes included in the folders are shown as 2, 0, 0, 0, 3, 2 from top to bottom.

Figure 6B:
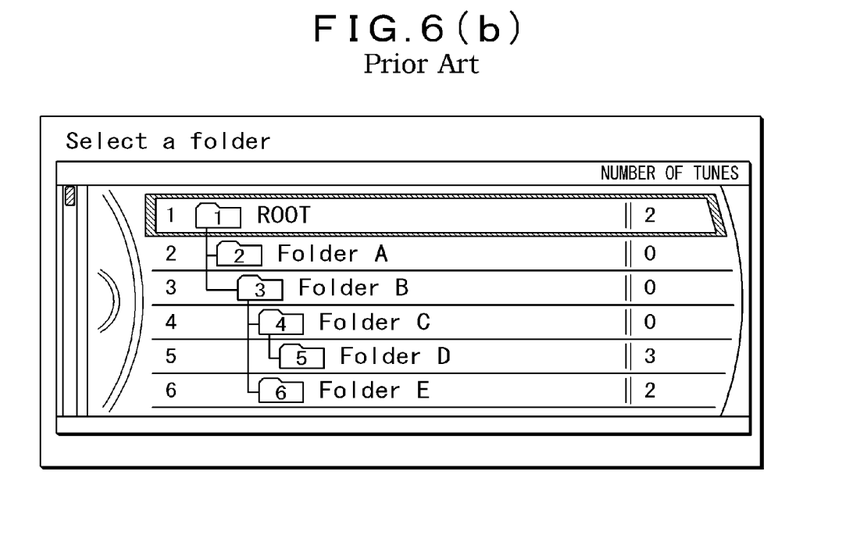

The car audio apparatus, when used by a driver, needs to perform the listing understandable at a glance in such a small display area in order not to interfere with driving. Thus, the listing would inevitably be a parallel listing as shown in FIG. 6(a). However, in order to list the folders anyway with their hierarchical structure, the folders may be listed indented based on the structure in FIG. 5, for example as shown in FIG. 6(b). In addition, in order to further highlight the hierarchical structure, a tree structure indicating the hierarchical structure may be additionally displayed as shown in FIG. 6(b). This method is well known as a hierarchical listing of folders in personal computers.

JP-A-2004-030116 discloses a method for listing folders in different hierarchical levels in a storage medium aligned with each other regardless of their hierarchical levels, according to a playlist management table. JP-A-2007-250036 discloses a method for displaying structure information by analyzing hierarchical structure of folders stored in a storage medium, creating the structure information including information on the hierarchical structure and information on data stored in the folders, and marking a folder that does not include available data as empty folder.

As described above, when listing folders included in a database on a small display area such as the display of a car audio apparatus as shown in FIG. 6 in a manner understandable at a glance to drivers, a method of not displaying the hierarchical structure of the folders, as shown in FIG. 6(a), is often used. Further, the hierarchical structure of the folders may be displayed according to a method used by conventional personal computers, as shown in FIG. 6(b).

However, according to this displaying method, since the entire hierarchical structure of the folders is simply displayed as it is, even a folder directly under which no file (tune) exists is displayed. In the example shown in FIG. 6(b), although no tune exists directly under the "Folder A" and any folder under the "Folder A," the "Folder A" is always displayed. It would be extremely undesirable for a user searching for a desired tune to be always displayed such a meaningless folder, especially on an apparatus with a small display area. This case is not shown in FIG. 6(b), but as seen from FIG. 5, the "Folder F" is always displayed by scrolling FIG. 6(b).

Further, in the example shown in FIG. 6(b), no tune exists directly under the "Folder B" and the "Folder F." Focusing the "Folder B," tunes only exist directly under the "Folder D" under the "Folder C" under the "Folder B" and directly under the "Folder E" under the "Folder B."

In the case that no tune exists directly under one folder and a tune exists directly under another folder under the one folder as above, displaying the hierarchical structure of the folders is useful for a user to understand it. However, for example, when using the database on a car audio apparatus, the user's first priority is to search for a desired tune, and the user does not necessarily need to know the hierarchical structure of the folder directly under which the tune exists. However, the user is more likely to know the hierarchical structure than in the case that no file exists directly under one folder and any folder under the one folder.

Accordingly, it is desirable that the hierarchical structure of the folder directly under which the tune exists can be displayed on the display, and, when the user absolutely needs to know the hierarchical structure, the car audio apparatus, for example, displays the hierarchical structure in a manner understandable if the user stops the car and observes thoroughly. Such a need also exists not only in a car audio apparatus but also in a home audio apparatus, and a similar need exists in using an apparatus with a small display area, such as personal digital assistant or mobile phone, as audio apparatus.

In view of the above, it is an object of the present invention according to one embodiment to provide an audio apparatus in which, when many files stored in a database are organized in folders, the folders can be listed in a manner understandable at a glance even on a small display area and with a hierarchical structure in the minimum level of detail.

SUMMARY

In order to solve the above problem, according to an aspect of the invention, an audio apparatus includes: a folder selection section for selecting a folder from a database in which files are stored in hierarchically structured folders; a file-directly-under-folder detection section for detecting whether or not a playable file exists directly under the folder selected by the folder selection section; a file-directly-under-folder-under-folder detection section for, if the file-directly-under-folder detection section has detected that no playable file exists directly under the selected folder, detecting whether or not a playable file exists directly under any folder under the selected folder; a normal mode listing section for, if the file-directly-under-folder detection section has detected a playable file, performing a normal listing on a display; a listing mode changing section for, if the file-directly-under-folder detection section has detected no playable file and the file-directly-under-folder-under-folder detection section has detected a playable file, performing the listing in a manner different from that in which the normal mode listing section performs the listing; and a folder-to-be-hidden selection section for, if the file-directly-under-folder detection section has detected no playable file and the file-directly-under-folder-under-folder detection section has detected no playable file directly under any folder under the selected folder, determining the selected folder to be hidden.

According to another aspect of the invention, the audio apparatus further includes a listing position control section for adjusting the listing position of a folder determined to be listed by the normal mode listing section and the listing mode changing section to a position corresponding to the hierarchy of the folder.

According to another aspect of the invention, in the audio apparatus, the listing position control section also closes up in order a space for the folder determined to be hidden by the folder-to-be-hidden selection section by displaying a folder to be listed next.

According to another aspect of the invention, in the audio apparatus, the folder to be listed by the listing mode changing section is displayed more dimly than the folder to be listed by the normal mode listing section.

With the apparatus of the invention configured as above, when many files stored in a database are organized in folders, the folders can be listed in a manner understandable at a glance even on a small display area and with a hierarchical structure in the minimum level of detail.

DETAILED DESCRIPTION

Figure 1:
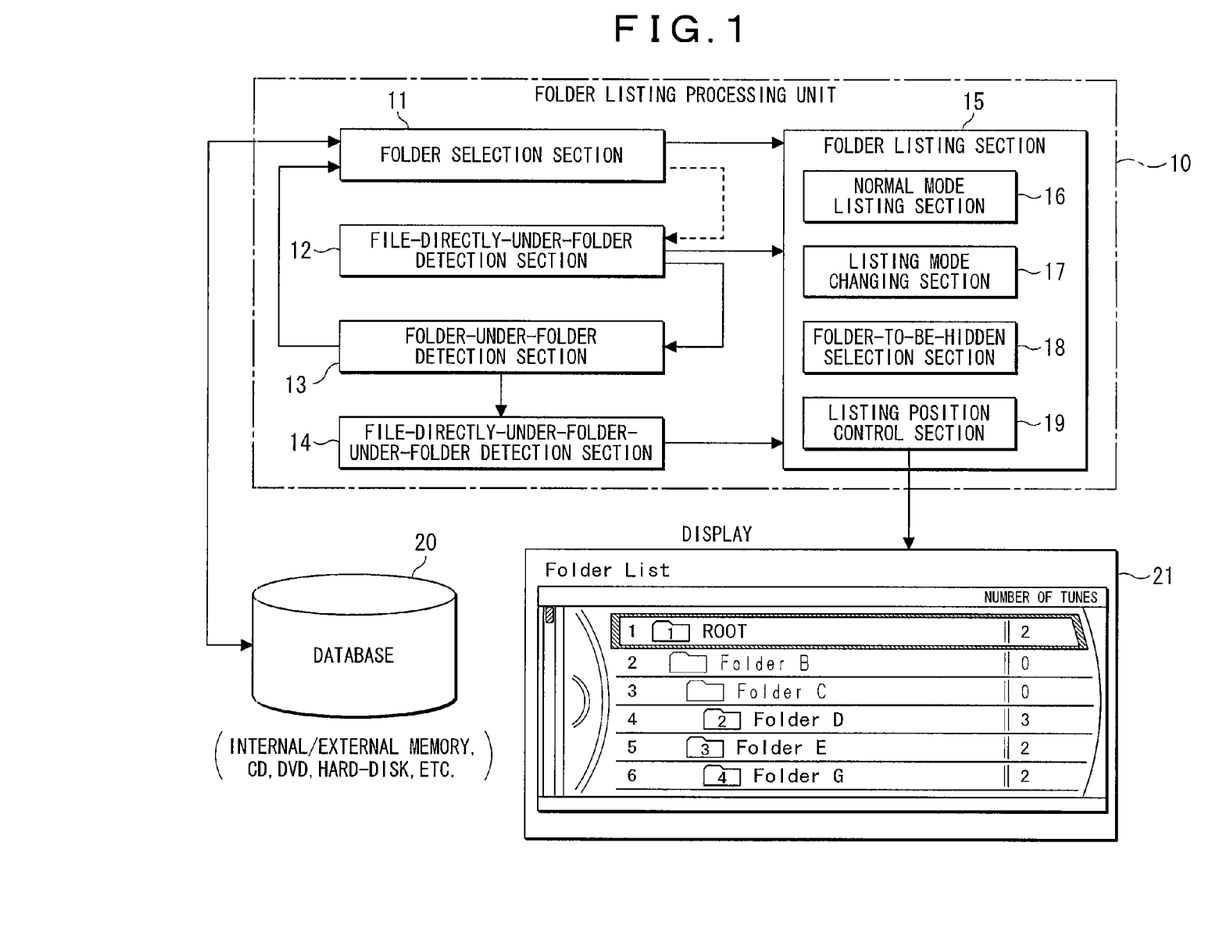
FIG. 1 is a function block diagram of an embodiment of the invention.

An embodiment of the invention is described with reference to the drawings. FIG. 1 is a function block diagram of the embodiment of the invention, focusing a functional part for folder listing processing. In a folder listing processing unit 10 shown in FIG. 1, with data of many tunes in, for example, mp3 format stored as files in a database 20, in order to list folders including tunes on a display 21 to allow a user to search the files for a desired tune, a folder selection section 11 selects and retrieves a folder from the database 20 in the order based on the folder hierarchy. It should be noted that storage media that can be used for the database 20 includes, for example, a memory within the audio apparatus, external memory such as USB memory, CD, DVD, hard disk and the like.

When folders are listed on the display 21 and the user performs scrolling in order to see a further folder not displayed on the display 21, the folder selection section 11 selects a folder to be shown next according to the direction of scrolling.

The example shown in FIG. 1 includes a file-directly-under-folder detection section 12. For a folder having been selected by the folder selection section 11 as above, the file-directly-under-folder detection section 12 detects a file that can be played by the audio apparatus in the selected folder itself, or directly under the selected folder. In the example shown in FIG. 6, two files exist directly under the "ROOT," and those files are audio files in mp3 format. Thus, the file-directly-under-folder detection section 12 detects that two playable files exist directly under the "ROOT." On the other hand, the WARD.doc document file exists directly under the "Folder A," but this file is not an audio file that can be played by the audio apparatus. Thus, the file-directly-under-folder detection section 12 detects that no playable file exists directly under the "Folder A." Similar detection is attempted on the remaining folders. All the file-directly-under-folder detection section 12 needs to do is to detect whether or not a playable file exists directly under the selected folder, and the resulted data may be used to display on the display 21 the number of playable files, such as the number of tunes included in each folder.

When the file-directly-under-folder detection section 12 detects that no playable file exists directly under the selected folder, a folder-under-folder detection section 13 detects whether a lower-level folder belonging to the selected folder, or a folder under the selected folder exists or not. This detection is performed by accessing the database 20 through the folder selection section 11.

All the folder-under-folder detection section 13 needs to do is to detect whether or not a folder exists under the selected folder at least when the file-directly-under-folder detection section 12 has detected that no playable file exists directly under the selected folder, as described above. Additionally, when the folder selection section 11 has selected folders, the folder-under-folder detection section 13 may detect a folder under all of the selected folders in parallel with the detection of the number of the files directly under each of those folders.

When the folder-under-folder detection section 13 has detected that a folder exists under the selected folder, a file-directly-under-folder-under-folder detection section 14 detects a playable file existing in the detected folder, or directly under the detected folder. Again, all the file-directly-under-folder-under-folder detection section 14 needs to do is to detect whether or not a playable file exists at least directly under any folder under the selected folder. Additionally, the file-directly-under-folder-under-folder detection section 14 may detect the number of playable files that can be used for displaying the number of playable files on the display later. Further, the file-directly-under-folder-under-folder detection section 14 would detect a playable file in every folder in all the hierarchies under the selected folder.

Figure 4:
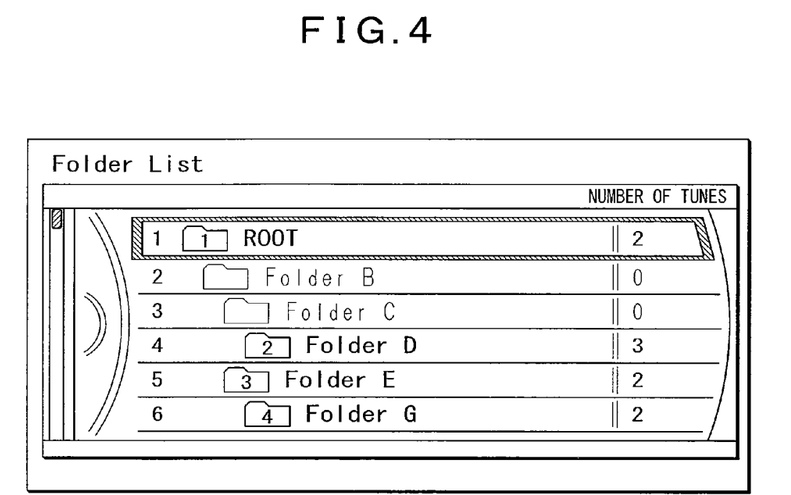
FIG. 4 shows an example of a listing as the result of processing.

In a folder listing section 15, based on the result detected by the file-directly-under-folder detection section 12 from the folders selected by the folder selection section 11, or based on the resulted playable files detected by the file-directly-under-folder-under-folder detection section 14 from the folders under the selected folder detected by the folder-under-folder detection section 13, a normal mode listing section 16, a listing mode changing section 17, a folder-to-be-hidden selection section 18 and a listing position control section 19 cooperatively operate to finally perform a folder listing, for example, as displayed on the display 21, i.e., as shown enlarged in FIG. 4.

In the folder listing section 15, the normal mode listing section 16 performs a preset normal listing when the file-directly-under-folder detection section 12 has detected that a playable file exists directly under the selected folder. On the other hand, when the file-directly-under-folder detection section 12 has detected that no playable file exists directly under the selected folder, the listing mode changing section 17 performs the listing in a manner different from that in which the normal mode listing section 16 performs the listing, indicating that no playable file exists directly under the selected folder. Although various types of listing may be used in this case, the selected folder directly under which no playable file exists is desirably displayed dimly to be inconspicuous since this folder is not very meaningful to the user.

When the file-directly-under-folder detection section 12 has detected that no playable file exists directly under the selected folder, and the folder-under-folder detection section 13 has detected a. folder existing under the selected folder, and the file-directly-under-folder-under-folder detection section 14 has detected that no playable file exists directly under the detected folder, the folder-to-be-hidden selection section 18 determines that the selected folder is to be hidden. Accordingly, when it is detected that no playable file exists directly under any folder under the selected folder, any folder under the selected folder is also determined to be hidden.

When any folder to be hidden as above exists, the listing position control section 19 closes up in order a space for the folder to be hidden and performs the listing. The listing position control section 19 adjusts the position of a folder that has been determined not to be hidden by the folder-to-be-hidden selection section 18 to a position corresponding to its hierarchy, or such that, when the text display direction of the display 21 is horizontal, the lower the hierarchy, the more right the position is.

Figure 2:
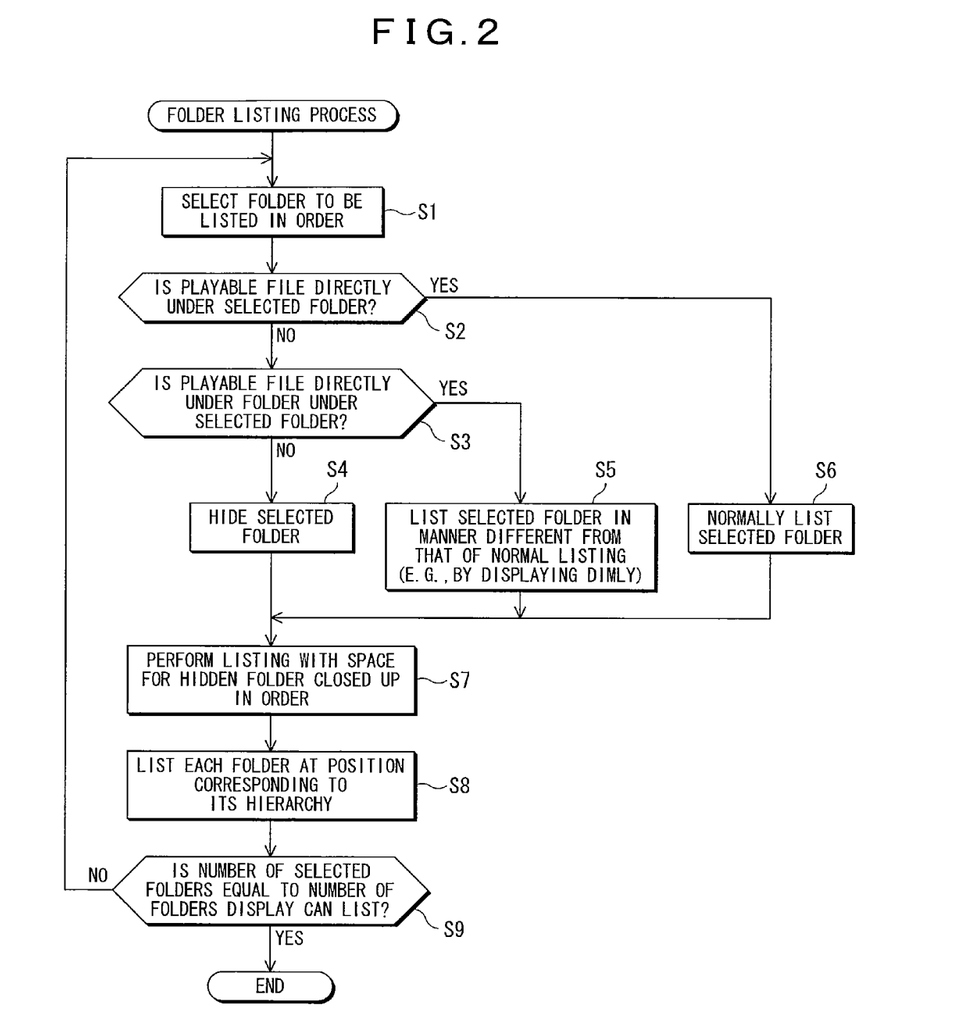
FIG. 2 is a flowchart showing operational flow of the embodiment.

The folder listing processing unit 10 including the function blocks as described above can be implemented through the operation according to an operation flow shown in FIG. 2, for example. A folder listing process shown in FIG. 2 starts with selecting in order a folder to be listed (step S1). In this operation, the folder selection section 11 in FIG. 1, in the example shown in FIG. 5, selects a folder in the order from "ROOT" at the top, unless otherwise specified.

Next, it is determined whether or not a playable file exists directly under the selected folder (step S2). In this operation, the file-directly-under-folder detection section 12 in FIG. 1 detects a playable file existing directly under the selected folder, and, when no playable file is detected, it is determined that no playable file exists directly under the selected folder. In the example in FIG. 2, if determined in step S2 that a playable file exists directly under the selected folder, the selected folder is normally listed (step S6). In this operation, when the file-directly-under-folder detection section 12 detects that a playable file exists, the normal mode listing section 16 of the folder listing section 15 in FIG. 1 performs the normal listing.

On the other hand, if determined in step S2 that no playable file exists directly under the selected folder, it is determined whether or not a playable file exists directly under any folder under the selected folder (step S3). In this case, this determination is performed on this folder belonging to the selected folder and any folder in a hierarchy lower than the hierarchy of this folder. In this determination, if a playable file is detected directly under any one folder under the selected folder, the detection operation may be terminated. In this operation, when the file-directly-under-folder detection section 12 in FIG. 1 detects that no playable file exists, the folder-under-folder detection section 13 detects in order a folder under the selected folder, and the file-directly-under-folder-under-folder detection section 14 detects a playable file, and then, it is detected whether or not no playable file exists directly under any folder under the selected folder.

If determined in step 3 that a playable file exists directly under any folder under the selected folder, the selected folder is listed in a manner different from that of the normal listing in step S6 (step S5). In this case, the selected folder is desirably displayed dimly (for example, more dimly than the normal listing) such that a user needs to be somewhat attentive to see.

For example, when a folder listing with a folder structure that may not be very useful information for the user is performed on a small display area of a car audio apparatus, the different way of folder listing described above can prevent the folder listing for searching folders for a tune from being difficult to see due to the normal listing of an unnecessary folder. In this operation, when the file-directly-under-folder detection section 12 detects no playable file, the listing mode changing section 17 of the folder listing section 15 in FIG. 1 performs the listing in a manner different from that in which the normal mode listing section 16 performs the listing.

If determined in step S3 that no playable file exists directly under any folder under the selected folder, the selected folder is determined to be hidden (step S4). In this operation, when no playable file is detected directly under any folder under the selected folder detected by the folder-under-folder detection section 13 in FIG. 1, the folder-to-be-hidden selection section 18 of the folder listing section 15 selects the selected folder. In this case, the selected folder and any folder under the selected folder are selected to be hidden.

After the listing processes in steps S4, S5 and S6 in respective modes are performed, the listing is performed with a space for the folder to be hidden closed up in order (step S7) and each folder to be listed is displayed at a position corresponding to the hierarchy of the folder (step S8). Specifically, when a folder that is determined to be hidden in step S4 exists and a folder that is determined to be listed in step S5 or S6 exists, a space for the folder to be hidden is not left blank but is closed up in order and the folder to be listed is displayed in the next listing process. If the text display direction of the display is horizontal, the folder to be listed is displayed at a position corresponding to its hierarchy, or such that, the lower the hierarchy, the more right the position is.

Then, it is determined whether or not the number of selected folders is equal to the number of folders to be listed on the display (step S9). If the number of selected folders is less than the number of folders to be listed on the display, it is determined that a further folder can be selected to be listed on the display, and the process returns to step Si to repeat the above-described steps. If determined that the number of selected folders is equal to the number of folders to be listed on the display in step S9, or, for example, if the display can list six folders, and six folders are listed after the closing up in order, it is determined that no further folder can be selected to be listed on the display, and the process ends (step S10).

In this process, when the user wants to see a further folder other than folders listed on the display and performs scrolling, in step S1 again, a folder to be listed by the scrolling is selected and processed in order, and in steps S5 and S6, the folder to be listed is displayed at a given position in the determined display mode.

FIG. 3 shows a result of a series of processes described above. FIG. 3(a) shows a listing of folders the structure of which is as shown in FIG. 5 in the conventional listing manner shown in FIG. 6(a). It should be noted that "Folder F" and "Folder G" are not displayed on the display, but are shown for the purpose of reference. On the other hand, according to the invention, first, as shown in FIG. 3(b), the folders are listed depending on the presence of a playable file directly under the selected folder and any folder under the selected folder according to steps S4 to S6 in FIG. 2 and with a space for a folder to be hidden closed up in order in step S7. Next, as shown in FIG. 3(c), the folders are displayed at positions corresponding to their hierarchies according to step S8 in FIG. 2.

Figure 3A:
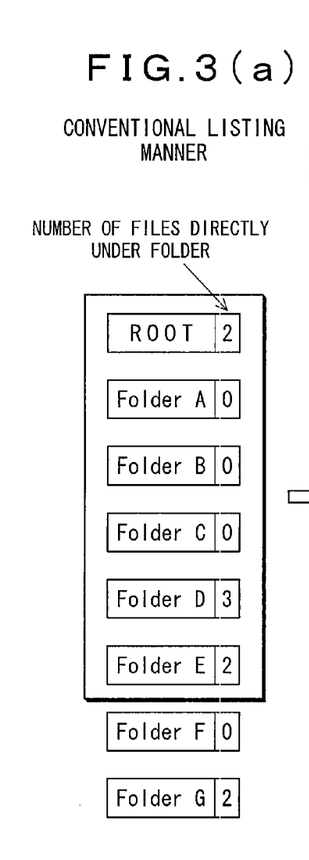
FIGS. 3(a), 3(b), 3(c) and 3(d) show results of processing according to the invention.
Figure 3B:
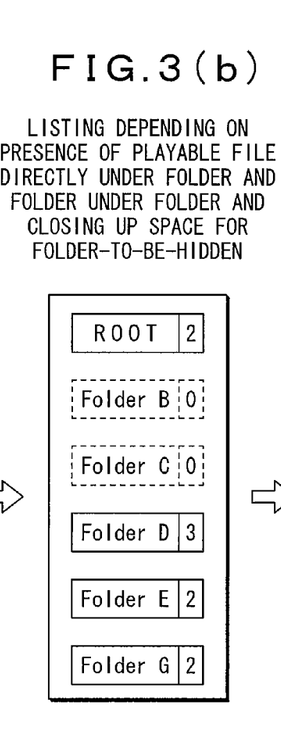
Figure 3C:
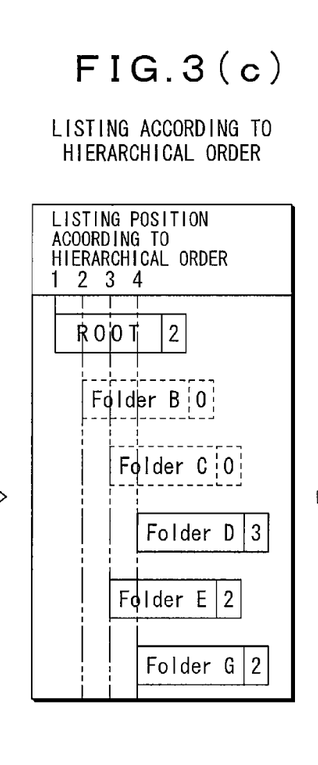
Figure 3D:
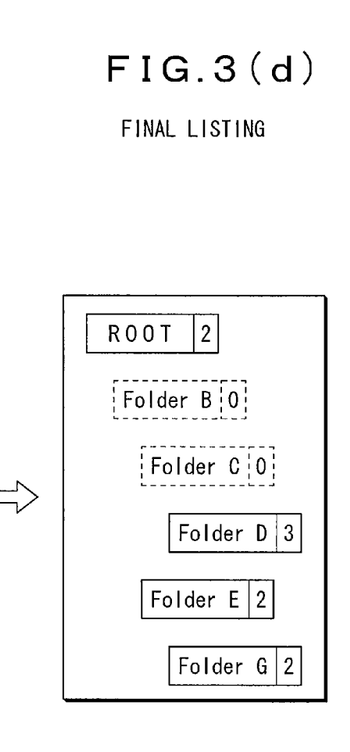

As a result of these processes, a final listing is performed as shown in FIG. 3(d). Conventionally, the listing of folders is performed only as shown in FIG. 6(a) or in a hierarchical manner as shown in FIG. 6(b) using a well-known method, whereas the invention provides the listing as shown in FIG. 4 using the above-described listing method. For example, this listing method allows an apparatus with only a small display area, such as car audio apparatus, to list folders in a very user-friendly manner. With this method, when files stored in a database are files that can be played by an audio apparatus, a desired playable file can be easily searched for.

Although preferred embodiments have been described in detail, the present invention is not limited to these specific embodiments of the present invention. Rather, various modifications and changes can be made without departing from the scope of the present invention as described in the accompanying claims. Accordingly, all such modifications are intended to be included within the scope of this invention as defined in the following claims.

What is claimed is:

1. An audio apparatus comprising:
    a folder listing processing unit coupled to a display screen of an audio apparatus and coupled to a database having a plurality of files stored therein, the folder listing processing unit configured to detect and display on the display screen, playable files in a folder, the folder listing processing unit, comprising:
        a folder selection section configured to select a folder from the database, the database containing the plurality of files stored in hierarchically structured folders;
        a directly-under-folder detection section configured to detect whether a playable file exists directly under the selected folder;
        a folder-under-folder detection section configured to detect whether playable files exist directly under any folder located under the selected folder, if no playable file exists directly under the selected folder;
        a folder listing section configured to display a folder listing on the display screen based on results from a normal mode listing section, a listing mode changing section, and a hidden selection section, the folder listing including a total number of detected playable files located in each folder according to a root folder directory hierarchy;
    wherein the normal mode listing section determines that a selected folder is to be displayed in a normal-listing mode, if the directly-under-folder detection section has detected one or more playable files;
    wherein the listing mode changing section determines that a selected folder is to be displayed in a secondary-listing mode such that the selected folder is displayed dimly relative to a selected folder displayed in the normal-listing mode, if the directly-under-folder detection section has detected no playable file but the folder-under-folder detection section has detected one or more playable files; and
    wherein the hidden selection section determines that a selected folder is to be hidden, if the directly-under-folder detection section has detected that no playable file exists in the selected folder and the folder-under-folder detection section has detected that no playable file exists directly under any folder under the selected folder.

2. The audio apparatus according to claim 1, further comprising a listing position control section configured to adjust a listing position of a folder listed in the normal-listing mode or listed in the secondary-listing mode, to a position corresponding to the hierarchy of the root folder.

3. The audio apparatus according to claim 1, wherein the listing position control section removes blank display lines corresponding to the selected folder to be hidden.

4. A method of detecting and displaying playable files in a folder of an audio apparatus having a display screen, the method, comprising:
    selecting a folder from a database, by a folder selection section, the database containing a plurality of files stored in hierarchically structured folders;
    detecting, by a directly-under-folder detection section, whether a playable file exists directly under a selected folder;
    detecting, by a folder-under-folder detection section, whether playable files exist directly under any folder located under the selected folder, if no playable file exists directly under the selected folder;
    displaying on the display screen, by a folder listing section, a folder listing based on results from a normal mode listing section, a listing mode changing section, and a hidden selection section, the folder listing including a total number of detected playable files located in each folder according to a root folder directory hierarchy;
    wherein the normal mode listing section determines that a selected folder is to be displayed in a normal-listing mode, if the directly-under-folder detection section has detected one or more playable files;
    wherein the listing mode changing section determines that a selected folder is to be displayed in a secondary-listing mode such that the selected folder is displayed dimly relative to a selected folder displayed in the normal-listing mode, if the directly-under-folder detection section has detected no playable file but the folder-under-folder detection section has detected one or more playable files; and
    wherein the hidden selection section determines that a selected folder is to be hidden, if the directly-under-folder detection section has detected that no playable file exists in the selected folder and the folder-under-folder detection section has detected that no playable file exists directly under any folder under the selected folder.

5. The method according to claim 4, comprising adjusting by a listing position control section, a listing position of a folder listed in the normal-listing mode or listed in the secondary-listing mode, to a position corresponding to the hierarchy of the root folder.

6. The method according to claim 4, comprising removing blank display lines corresponding to the selected folder to be hidden by the listing position control section.

\* \* \* \* \*